(12) United States Patent
Niittyinperä et al.

(10) Patent No.: US 10,334,341 B2
(45) Date of Patent: Jun. 25, 2019

(54) APPARATUS AND METHOD FOR PROVIDING AN APPARATUS COMPRISING A COVERING PORTION FOR AN ELECTRONIC DEVICE

(71) Applicant: Nokia Technologies Oy, Espoo (FI)

(72) Inventors: Mika Niittyinperä, Raisio (FI); Lasse Pykäri, Salo (FI)

(73) Assignee: Nokia Technologies Oy, Espoo (FI)

( * ) Notice: Subject to any disclaimer, the term of this patent is extended or adjusted under 35 U.S.C. 154(b) by 15 days.

(21) Appl. No.: 14/566,619

(22) Filed: Dec. 10, 2014

(65) Prior Publication Data

US 2015/0181321 A1     Jun. 25, 2015

(30) Foreign Application Priority Data

Dec. 20, 2013  (GB) .................................. 1322706.1

(51) Int. Cl.
*H04M 1/03* (2006.01)
*H04R 1/08* (2006.01)

(52) U.S. Cl.
CPC .............. *H04R 1/086* (2013.01); *H04M 1/03* (2013.01)

(58) Field of Classification Search
CPC ................................ H04R 1/086; H04M 1/03
USPC .......................................................... 381/189
See application file for complete search history.

(56) References Cited

U.S. PATENT DOCUMENTS

| 6,108,416 A | 8/2000 | Collin et al. |
| 6,365,854 B1 | 4/2002 | Maattanen |
| 8,515,113 B2 | 8/2013 | Rothkopf et al. |
| 2006/0293091 A1* | 12/2006 | Hawker ................ H04M 1/03 455/575.1 |
| 2008/0123891 A1* | 5/2008 | Kato ..................... H04M 1/03 381/361 |
| 2008/0130935 A1* | 6/2008 | Sato ..................... H04R 1/2884 381/361 |
| 2009/0092274 A1* | 4/2009 | Song .................... H04R 19/016 381/369 |
| 2009/0175479 A1* | 7/2009 | Shirasaka ............. H04R 1/08 381/361 |
| 2010/0067732 A1 | 3/2010 | Hachinohe et al. |
| 2010/0195864 A1* | 8/2010 | Lutz .................... H04R 19/04 381/433 |

(Continued)

FOREIGN PATENT DOCUMENTS

| CN | 201878205 U | 6/2011 |
| CN | 102480538 A | 5/2012 |
| CN | 202889436 U | 4/2013 |

(Continued)

OTHER PUBLICATIONS

Extended European Search Report received for corresponding European Patent Application No. 14195742.3, dated May 15, 2015, 5 pages.

(Continued)

*Primary Examiner* — Sean H Nguyen
(74) *Attorney, Agent, or Firm* — Harrington & Smith

(57) ABSTRACT

An apparatus and method of providing an apparatus, the apparatus comprising: a covering portion configured to cover at least part of an electronic device; and a microphone configured to be electrically connected to the covering portion; wherein at least one electrical connection for the microphone is provided on the covering portion.

19 Claims, 5 Drawing Sheets

(56) References Cited

U.S. PATENT DOCUMENTS

Figure 1:
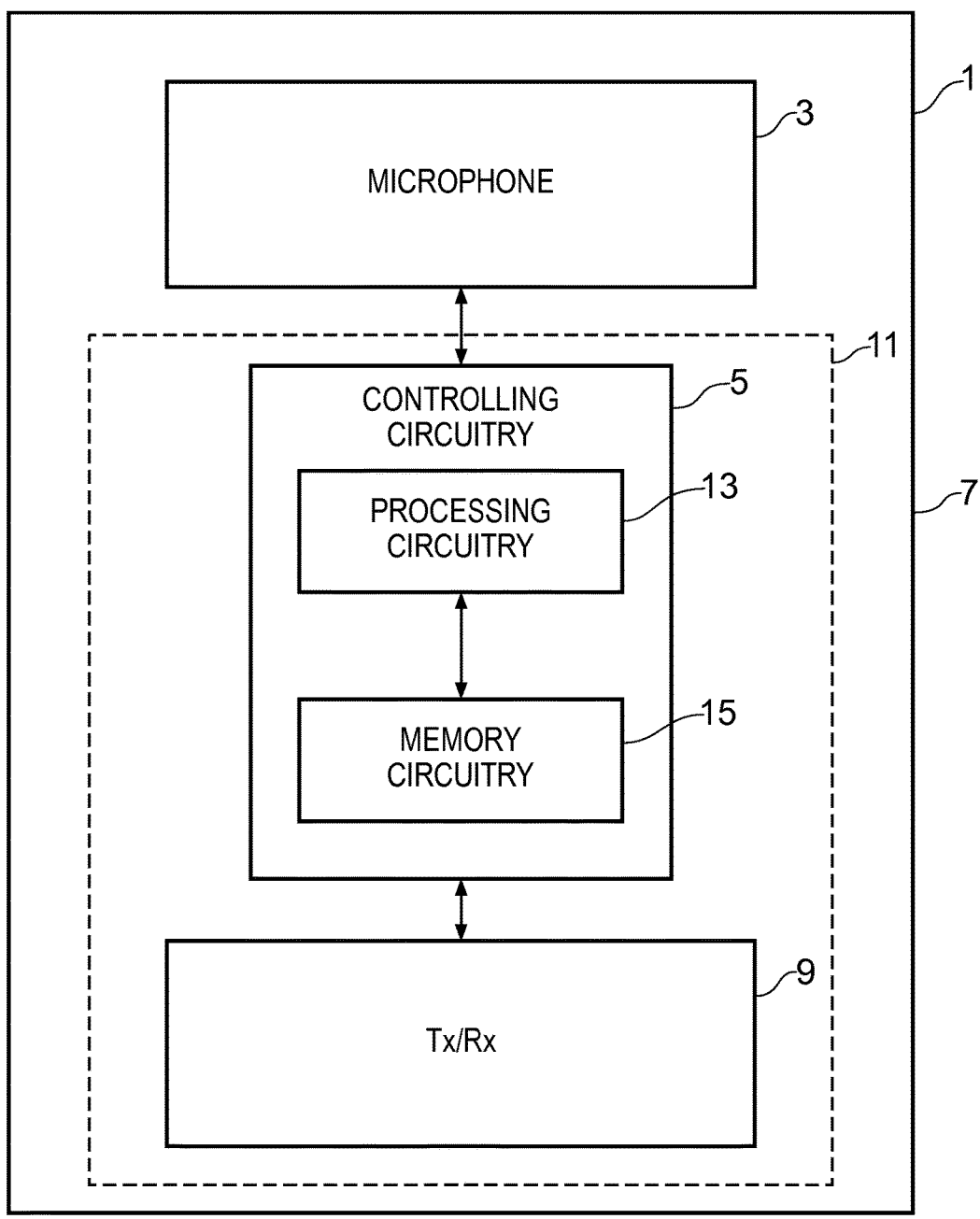

2012/0177237 A1     7/2012   Shukla et al.
2014/0233782 A1*   8/2014   Bolognia ................. H04R 1/04
                                                                                                                                                                 381/360

FOREIGN PATENT DOCUMENTS

| EP | 0792055 A2 | 8/1997 |
| EP | 0939533 A2 | 9/1999 |
| EP | 1098497 A2 | 5/2001 |
| EP | 1175070 A1 | 1/2002 |
| JP | 2008-182296 A | 8/2008 |
| WO | 20091019031 A1 | 2/2009 |

OTHER PUBLICATIONS

Search Report received for corresponding United Kingdom Patent Application No. 1322706.1, dated May 22, 2014, 4 pages.

* cited by examiner

APPARATUS AND METHOD FOR PROVIDING AN APPARATUS COMPRISING A COVERING PORTION FOR AN ELECTRONIC DEVICE

TECHNOLOGICAL FIELD

Embodiments of the present invention relate to an apparatus and method for providing an apparatus comprising a covering portion for an electronic device. In particular, they relate to an apparatus and method for providing an apparatus comprising a covering portion for an electronic device wherein the device comprises a microphone or other type of sensor.

BACKGROUND

Electronic devices such as mobile telephones or tablet computers comprising microphones or other sensors are known. Such electronic devices may be assembled by mounting a microphone assembly, or other type of sensor, on a circuit board along with the other electronic components of the apparatus.

Using such methods of assembly the microphones could be misaligned with inlets on the cover of the electronic devices. This might lead to a suboptimal performance of the microphone or other sensors.

BRIEF SUMMARY

According to various, but not necessarily all, examples of the disclosure there may be provided an apparatus comprising: a covering portion configured to cover at least part of an electronic device; and a microphone configured to be electrically connected to the covering portion; wherein at least one electrical connection for the microphone is provided on the covering portion.

In some examples the microphone may be connected to the covering portion so that the microphone is provided adjacent to an audio inlet on the covering portion.

In some examples the covering portion may be configured to provide at least part of a housing of an electronic device.

In some examples the covering portion may be configured to provide at least a portion of an internal cover of an electronic device.

In some examples the microphone may be provided within a microphone assembly.

In some examples the microphone may be adhered to the covering portion. The microphone may be soldered to the covering portion.

In some examples the at least one electrical connection may be printed on to the covering portion.

In some examples the covering portion and the at least one electrical connection may be integrally formed.

In some examples the at least one electrical connection on the covering portion may be configured to enable the microphone to be electrically connected to components on a circuit board.

In some examples a gap may be provided between the microphone assembly and a circuit board.

In some examples an over coating portion may be provided overlaying the microphone.

In some examples the microphone may comprise a digital microphone.

In some examples the microphone may comprise an analogue microphone.

According to various, but not necessarily all, examples of the disclosure there may be provided an electronic device comprising an apparatus as described above.

According to various, but not necessarily all, examples of the disclosure there may be provided a mobile telephone comprising an apparatus as described above.

According to various, but not necessarily all, examples of the disclosure there may be provided a method comprising: providing a covering portion configured to cover at least part of an electronic device; providing at least one electrical connection for a microphone on the covering portion; and configuring the microphone to be electrically connected to the covering portion.

In some examples the microphone may be connected to the covering portion so that the microphone is provided adjacent to an audio inlet on the covering portion.

In some examples the covering portion may be configured to provide at least part of a housing of an electronic device.

In some examples the covering portion may be configured to provide at least a portion of an internal cover of an electronic device.

In some examples the microphone may be provided within a microphone assembly.

In some examples the microphone may be adhered to the covering portion. The microphone may be soldered to the covering portion.

In some examples the at least one electrical connection may be printed on to the covering portion.

In some examples the covering portion and the at least one electrical connection may be integrally formed.

In some examples the at least one electrical connection on the covering portion may be configured to enable the microphone assembly to be electrically connected to components on a circuit board.

In some examples a gap may be provided between the microphone and a circuit board.

In some examples an over coating portion may be provided overlaying the microphone.

In some examples the microphone assembly may comprise a digital microphone.

In some examples the microphone assembly may comprise an analogue microphone.

According to various, but not necessarily all, examples of the disclosure there may be provided an apparatus comprising: a covering portion configured to cover at least part of an electronic device; and a sensor configured to be electrically connected to the covering portion; wherein at least one electrical connection for the sensor is provided on the covering portion.

According to various, but not necessarily all, examples of the disclosure there may be provided an apparatus comprising a microphone configured to be electrically connected to a substrate wherein the substrate is positioned underneath a housing of an electronic device and the substrate is electrically interfaced with a circuit board.

In some examples the substrate may comprise one or more other electronic components.

The apparatus may be for providing a covering portion for an electronic device. The electronic device may be an electronic device such as a mobile cellular telephone or tablet computer or any other type of electronic device which may comprise a microphone and/or other type of sensor.

BRIEF DESCRIPTION

Figure 2:
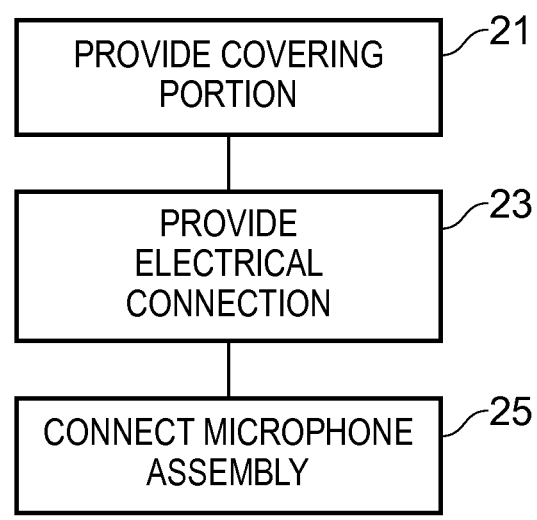
Figure 3:
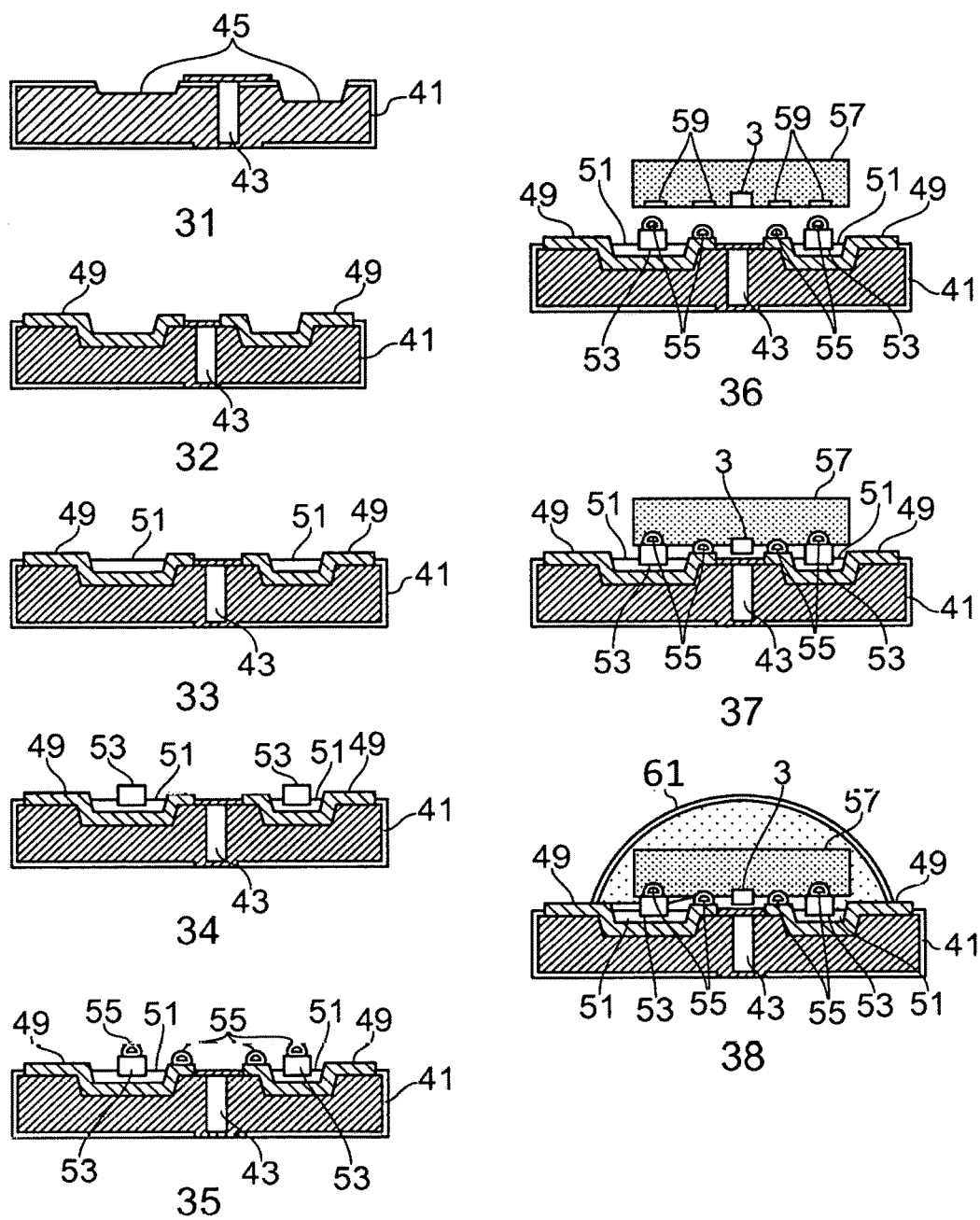
Figure 4:
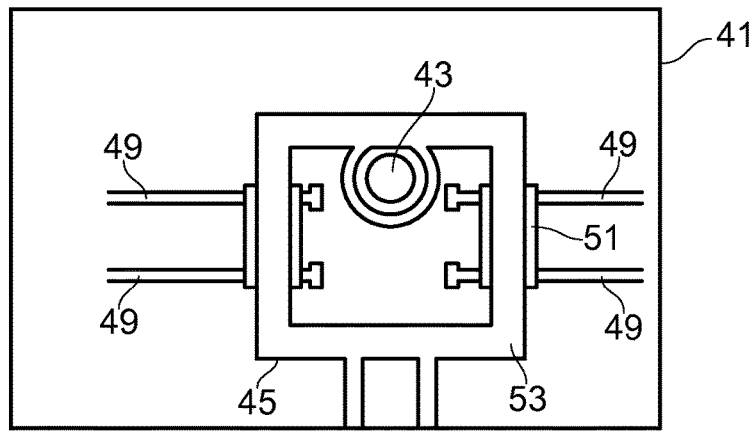
Figure 5:
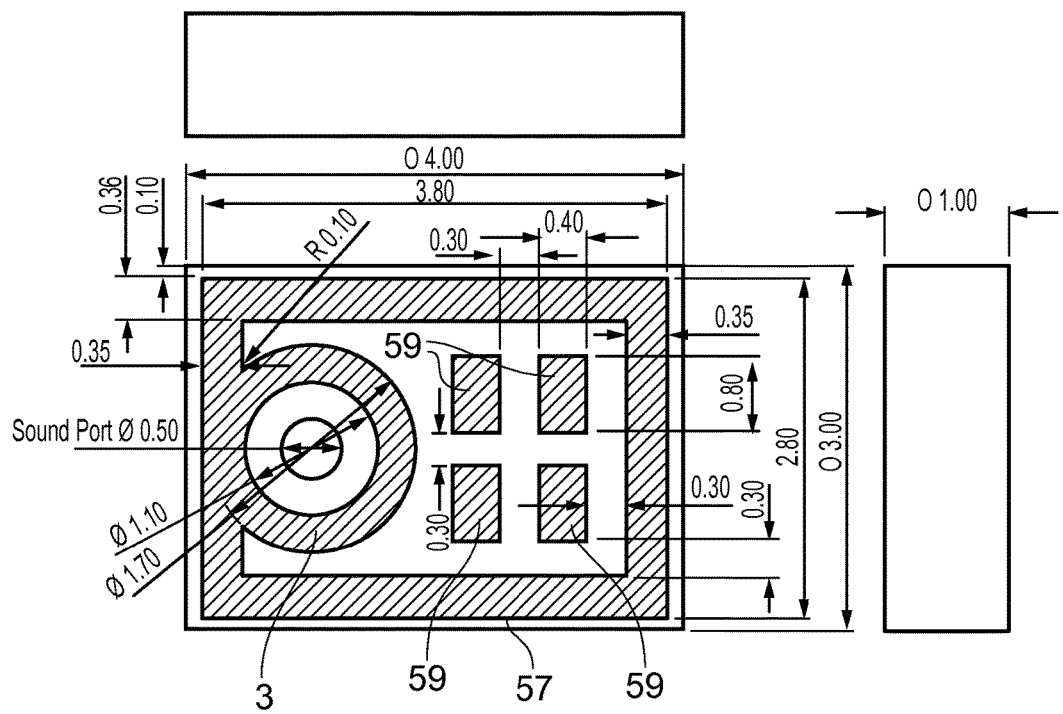
Figure 6A:
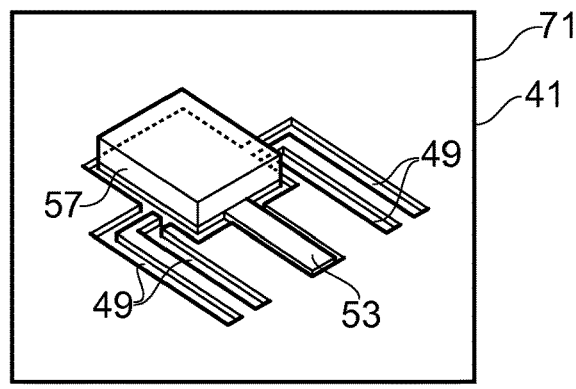
Figure 6B:
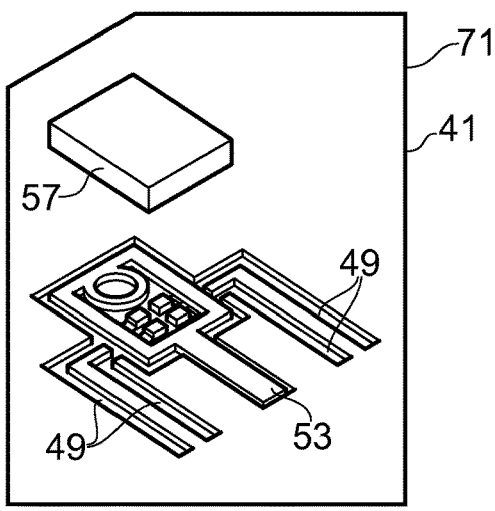
Figure 6C:
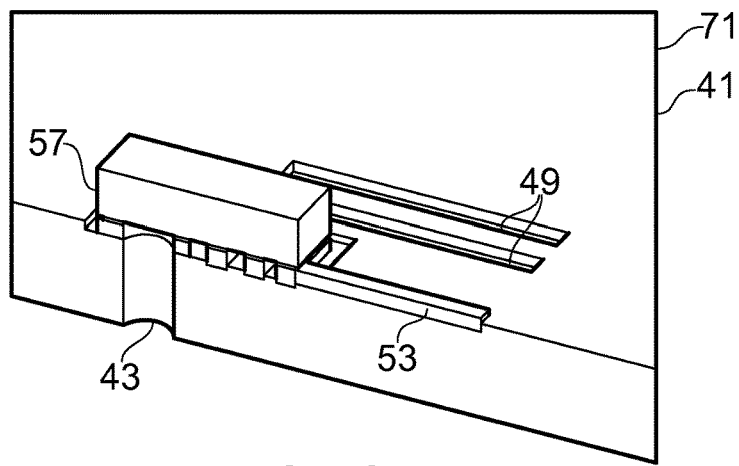

For a better understanding of various examples that are useful for understanding the detailed description, reference will now be made by way of example only to the accompanying drawings in which:

FIG. 1 illustrates an electronic device;
FIG. 2 illustrates a method;
FIG. 3 illustrates a method;
FIG. 4 illustrates conductive traces;
FIG. 5 illustrates a microphone assembly; and
FIGS. 6A to 6C illustrate an apparatus.

DETAILED DESCRIPTION

The Figures illustrate an apparatus comprising: a covering portion 41 configured to cover at least part of an electronic device 1; and a microphone 3 configured to be electrically connected to the covering portion 41; wherein at least one electrical connection for the microphone 3 is provided on the covering portion 41.

FIG. 1 schematically illustrates an electronic device 1 which may comprise an apparatus according to examples of the disclosure. The electronic device 1 may be for example, a mobile cellular telephone, a personal computer, a voice recorder or any other apparatus which may be configured to sense audio inputs such as a user speaking. The electronic device 1 may be a portable apparatus 1 which can be carried by the user, for example, in a user's hand or bag. The electronic device 1 may be a hand held device that is sized and shaped so that the user can hold the electronic device 1 in their hand while they are using the electronic device 1.

Only features referred to in the following description are illustrated in FIG. 1. However, it should be understood that the electronic device 1 may comprise additional features that are not illustrated.

The example electronic device 1 of FIG. 1 comprises a microphone 3, controlling circuitry 5 and a housing 7. In some examples the electronic device 1 may also comprise one or more transceivers 9 and a circuit board 11.

The housing 7 provides an external housing for the electronic device 1. When the user is holding or using the electronic device 1 they may touch the housing 7. The components of the electronic device 1, which are illustrated schematically in FIG. 1, may be contained within the housing 7. The housing 7 may provide protection for the components of the electronic device 1. For example, the housing 7 may protect the components of the electronic device 1 from atmospheric conditions such as moisture or temperature variations. The housing 7 may also be configured to protect the components of the electronic device 1 from mechanical impacts.

The housing 7 may comprise one or more covering portions. For example a housing 7 may comprises a first covering portion which may be configured to cover the front face of the electronic device 1 and a second covering portion which may be configured to cover a rear face of the electronic device 1. In some examples one or more of the covering portions may be configured to be removably attached to the electronic device 1. This may enable a user to remove the covering portion to access internal components of the electronic device 1, for example, to remove a battery or to add or remove a memory card.

The controlling circuitry 5 may be configured to control the electronic device 1. The controlling circuitry 5 may be configured to control the components of the electronic device 1 such as the microphone 3 and the transceiver 9 and any other components.

The controlling circuitry 5 may be configured to control the electronic device 1 to perform a plurality of different functions. For example, where the electronic device 1 is configured for wireless communications the controlling circuitry 5 may be configured to control the electronic device 1 to perform functions such as sending and receiving information.

In the example of FIG. 1 the controlling circuitry 5 comprises processing circuitry 13 and memory circuitry 15. The processing circuitry 13 may be configured to read from and write to the memory circuitry 15. The processing circuitry 13 may also comprise an output interface via which data and/or commands are output by the processing circuitry 13 and an input interface via which data and/or commands are input to the processing circuitry 13.

The electronic device 1 illustrated in FIG. 1 also comprises one or more transceivers 9. The transceivers 9 may comprise any means that enables the electronic device 1 to send data to and receive data from other devices. The transceiver 9 may be configured to enable wireless communication. For example the transceiver 9 may be configured to enable the electronic device 1 to operate in a cellular communications network.

In the example illustrated in FIG. 1 the transceiver 9 has been illustrated as a single entity. It is to be appreciated that the transceiver 9 may comprise a separate transmitter and receiver. It is also to be appreciated that more than one transmitter and more than one receiver may be provided within a single electronic device 1.

The one or more transceivers 9 may be configured to receive input signals from the controlling circuitry 5 and also to provide output signals to the controlling circuitry 5.

The controlling circuitry 5 may be mounted on a circuit board 11. In some examples some of the one or more transceivers 9 may also be mounted on a circuit board 11 as indicated by the dashed line.

The circuit board 11 may comprise any means which may be configured to support one or more electronic components and enable the electronic components to be electrically connected. The circuit board 11 may be a printed circuit board (PCB) a flexible circuit board or any other suitable type of circuit board. It is to be appreciated that in some examples the electronic device 1 may comprise more than one circuit board.

The microphone 3 may comprise any means which may be configured to detect an audio input signal and convert the detected audio input signal to an electrical output signal. The microphone 3 may be electrically connected to the controlling circuitry 5. The microphone 3 may be configured to receive input signals from the controlling circuitry 5 and also to provide output signals to the controlling circuitry 5.

In some examples microphone 3 may comprise a digital microphone. In some examples the microphone 3 may comprise an analogue microphone.

Microphones in portable electronic devices nowadays are usually one of the following types: electret condenser microphone (ECM) and micro electro mechanical system (MEMS) microphone.

Each of these microphones is usually incorporated in a casing that has one or more sound ports for receiving acoustic pressure waves.

The examples of this disclosure may be implemented by using microphones, including but not limited to ECM or MEMS microphones.

The microphone 3 may be provided as part of a microphone assembly. The microphone assembly may be a module comprising a microphone which can be easily connected to other electronic components within the electronic device 1. The microphone assembly may comprise a microphone 3 mounted on a support substrate. The support substrate may comprise electrical contacts which may enable electrical connections to be established between the microphone 3 and one or more conductive traces provided on a covering portion of the housing 7. In some examples the microphone assembly may also comprise other components such as an acoustic conduit which may be configured to conduct sound towards the microphone 3.

In some examples the electronic device 1 may also comprise one or more sensors. The one or more sensors may be provided instead of, or in addition to, the microphone 3. The one or more sensors may comprise any means which may be configured to detect one or more conditions of the current environment of the electronic device 1 and provide an output to the controlling circuitry 5 indicative of the detected condition. For example, the sensors may be configured to detect the current light levels around the electronic device 1, chemicals or other particles in the air or any other suitable parameter.

In the examples of the disclosure the microphone 3 may be connected to a covering portion of the electronic device 1. In such examples the covering portion may support the weight of the microphone 3 and/or microphone assembly so that the microphone 3 need not be mounted on the circuit board 11. In some examples there may be a gap provided between the microphone assembly and the circuit board 11. In some examples an over coating portion may be provided between the microphone assembly and a circuit board 11.

The microphone 3 may be connected to a covering portion using a method such as the example methods of FIGS. 2 to 3.

FIG. 2 illustrates a first example method of connecting a microphone assembly to a covering portion. At block 21 the method comprises providing a covering portion configured to cover at least part of an electronic device 1. The covering portion may be part of the housing 7 of an electronic device 1 as described above with reference to FIG. 1.

The method also comprises providing, at block 23, at least one electrical connection for the microphone on the covering portion. The at least one electrical connection may comprise a conductive trace which may be printed on the covering portion. The at least one electrical connection may enable a microphone to be electrically connected to components provided on a circuit board 11.

At block 25 the method also comprises configuring a microphone to be electrically connected to the covering portion. The microphone may also be connected to the covering portion so that the covering portion can bear the weight of the microphone. The microphone may be connected to the covering portion using any suitable means such as soldering or an adhesive or any other means. This may enable to microphone to be provided separately to the circuit board 11 and components mounted on the circuit board 11.

It is to be appreciated that in other examples of the disclosure other sensors may be used instead of, or in addition to, a microphone.

FIG. 3 illustrates a more detailed method of providing an apparatus according to examples of the disclosure.

In the example of FIG. 3 a covering portion 41 is provided at block 31. The covering portion 41 may be part of the housing 7 of an electronic device 1 as described above with reference to FIG. 1. The covering portion 41 may be configured to cover at least a portion of the electronic device 1. It is to be appreciated that the housing 7 may comprise other covering portions in addition to the portion illustrated in FIG. 3. A cross section through the covering portion 41 is illustrated in FIG. 3.

The covering portion may be a battery cover, a device cover, a unibody, a device chassis, a device back cover, a device front cover, a device side band or any other suitable part of a cover. The covering portion 41 may form part of an external housing 7. In some examples the covering portion 41 may be part of an internal cover which may be mechanically positioned underneath the housing 7.

In some examples the covering portion 41 may be rigid so that it does not bend or deform easily when a user applies a force to the housing 7. The covering portion 41 may be made of any suitable material such as plastic.

The covering portion 41 comprises an inlet 43. The inlet 43 may be an audio inlet. The audio inlet 43 may comprise a gap or hole in the covering portion 41 which may be configured to enable acoustic input signals to be provided to a microphone 3.

In the example of FIG. 3 a plurality of grooves 45 are provided on the covering portion 41. The grooves 45 may be provided on the inner side of the covering portion 41. The layout of the grooves 45 may correspond to the layout of a microphone assembly which is to be connected to the covering portion 41.

It is to be appreciated that in some examples the covering portion 41 might not be provided with the plurality of grooves 45. In such cases the conductive traces may be printed onto a flat inner surface of the covering portion 41.

At block 32 conductive traces 49 are provided on the covering portion 41. A plurality of conductive traces 49 may be provided. The layout of the conductive traces 49 may be determined by the layout of the microphone or microphone assembly which is to be connected to the covering portion 41. In the example of FIG. 3 at least some of the conductive traces 49 are provided in the plurality of grooves 45. The conductive traces 49 may follow the path created by the grooves 45.

The conductive traces 49 may comprise an electrically conductive material. In the example of FIG. 3 silver paste (Ag paste) is used. Once the Ag paste has been printed on the covering portion the paste may be cured. Example curing conditions would be a temperature of around 130° C. for a time of around 15 minutes. In other examples any other suitable conductive material could be used such as indium tin oxide. Other materials have different curing conditions and/or may be printed onto the covering portion using different techniques to the Ag paste.

At block 33 a dielectric material 51 is provided over portions of the conductive traces 49. The dielectric material 51 may be provided to prevent any short circuits being created between the conductive traces 49. In the example of FIG. 3 the dielectric material 51 is provided in the plurality of grooves 45.

The dielectric material 51 may comprise any suitable material such as an epoxy resin. Once the dielectric material 51 has been dispensed at the appropriate points on the conductive traces 49 the dielectric material 51 is cured. The curing conditions may depend upon the material which is used as the dielectric 51.

At block 34 further conductive traces 53 are provided. The further conductive traces 53 may comprise at least a portion which extends over the dielectric material 51. The further conductive traces 53 provided at block 34 may be configured to provide a ground connection for the microphone or microphone assembly.

The further conductive traces 53 may be made of any suitable material such as Ag paste or indium tin oxide or any other suitable material. Once the further conductive traces 53 have been printed on the covering portion 41 the further conductive traces 53 may be cured. Example curing conditions, where the further conductive traces 53 comprise Ag paste, would be a temperature of around 130° C. for a time of around 15 minutes.

At block 35 solder paste 55 is deposited on the conductive traces 49, 53. The solder paste may comprise any means which enables a microphone or microphone assembly to be connected to the covering portion 41. The solder paste 55 may comprise low temperature solder paste.

It is to be appreciated that other examples may use alternative materials to solder paste 55. In some examples an adhesive may be provided which may enable the microphone assembly to be adhered to the covering portion. The adhesive may comprise an isotropic conductive adhesive (ICA).

At block 36 a microphone assembly 57 is positioned overlaying the conductive traces 49, 53. The microphone assembly 57 comprises electrical contacts 59 which may enable electrical connections to be established between the microphone assembly 57 and the conductive traces 49, 53.

The microphone assembly 57 also comprises a microphone 3. The microphone assembly 57 may be positioned so that the microphone is provided adjacent to the audio inlet 43.

In the example of FIG. 3 the microphone assembly 57 comprises a bottom port assembly in which the contacts 59 and sound outlet are located on the same side. In other examples a top port assembly may be used in which the sound port and contacts 59 may be located on different sides.

At block 37 the microphone assembly 57 is connected to the covering portion 41. The microphone assembly 57 may be connected to the covering portion 41 using any suitable technique such as soldering, local reflow soldering, ICA curing or any other suitable technique.

A conductive connection may be provided between the microphone assembly 57 and the covering portion 41. The conductive connection may enable current to flow between the microphone assembly 57 and the covering portion 41 when the microphone assembly 57 is biased. The conductive connection may enable the microphone assembly 57 to be electrically connected to the covering portion 41 so that a direct current path may be provided between the conductive traces 49, 53 on the covering portion 41 and the microphone assembly 57. The direct current path may enable direct current flow between the conductive traces 49, 53 on the covering portion 41 and the microphone assembly 57. It is understood that the output signal of the microphone 3 may be transmitted (or carried) to processing circuitry 13 of the electronic device 1 by using at least one of the conductive traces 49, 53.

At block 38 an over coating portion 61 is provided. The over coating portion 61 may provide a protective layer for the microphone assembly 57.

When the electronic device 1 is fully assembled there may be a gap provided between the microphone assembly 57 and the circuit board 11. The over coating portion 61 may be provided in the gap between the microphone assembly 57 and the circuit board 11.

The over coating portion 61 may comprise any suitable material such as an epoxy resin. The epoxy resin may be dispensed over the microphone assembly 57 and then cured using any suitable technique.

As the microphone assembly 57 is connected to the covering portion 41 rather than a circuit board 11 it may be necessary to connect the conductive traces 49, 53 to the components on the circuit board 11. The electrical connections between the components on the circuit board 11 and the conductive traces 49, 53 may comprise any suitable means such as C-clips, pogo pins, a flexible electrical connection comprising a material such as anisotropic conductive film (ACF) or any other suitable means.

FIG. 4 shows an example layout of the conductive traces 49, 53 and the dielectric material 51 on the inner surface of a covering portion 41. The layout may be formed using the method described above in relation to FIG. 3.

It is to be appreciated that other layouts may be used in other examples of the disclosure. The layout which is used may depend upon the microphone assembly which is to be attached to the covering portion 41. For example four electrical connections may be provided where the microphone assembly comprises a digital microphone but only two connections may be needed if the microphone assembly comprises an analogue microphone.

FIG. 5 illustrates a layout of a microphone assembly 57 which may be used in some examples of the disclosure. The microphone assembly of FIG. 5 comprises a microphone 3 and a plurality of electrical contacts 59.

The microphone assembly 57 of FIG. 5 is a digital microphone assembly. It is to be appreciated that in other examples of the disclosure other types of microphone assembly 57, such as an analogue microphone assembly may be used.

FIGS. 6A to 6C illustrate an apparatus 71 according to examples of the disclosure. The apparatus 71 may be manufactured using the methods of FIG. 3 as described above. Corresponding reference numerals are used for corresponding features.

FIG. 6A illustrates a microphone assembly 57 connected to the covering portion 41. The microphone assembly 57 may be connected to the covering portion 41 so that the covering portion 41 bears the weight of the microphone assembly 57. The microphone assembly 57 may be connected to the covering portion 41 so that a direct current path is provided between the microphone assembly 57 and the conductive traces 49 on the covering portion 41.

FIG. 6B illustrates an exploded view of the apparatus 71 and provides an illustration of an example layout of the conductive traces 49, 53.

FIG. 6C illustrates a cross section through the apparatus 71. The microphone 3 may be positioned adjacent to the audio inlet 43. The contacts 59 of the microphone assembly 57 may be aligned with the conductive traces 49, 53.

The examples described above provide a microphone assembly 57 connected to a covering portion 41 of an electronic device 1. Having the microphone assembly 57 mounted on the covering portion 41 provides several advantages. It enables the microphone assembly 57 to be accurately aligned with the audio inlet 43 of the covering portion 41. This might not be possible in other devices 1 where the microphone assembly 57 may be mounted on the main circuit board 11.

This could be particularly beneficial for example if the user drops their electronic device 1. The impact of the drop may cause the circuit board to move slightly relative to the housing 7. This could mean that, even if the microphone 3 is accurately aligned with the audio inlet 43 during manufacture there could be some relative movement during the lifetime of the device 1. If the microphone assembly 57 is connected to the covering portion this relative movement would not occur. This reduces the problems which may be caused by misalignment of the microphone 3 with the audio inlet 43 such as the acoustic frequency response of the microphone 3 being sub-optimal.

The examples of the disclosure also allow for the microphone assembly 57 to be located closer to the audio inlet 43 of the covering portion 41 than in other electronic devices 1 where the microphone assembly 57 is mounted on a circuit board 11. This may reduce the amount of attenuation and/or leakage of the acoustic input signal and so may allow for smaller audio inlet 43 holes. This may reduce the size of the hole needed in the housing 7. This may provide for an aesthetically improved housing 7.

As used here 'module' refers to a unit or apparatus that excludes certain parts/components that would be added by an end manufacturer or a user.

The illustration of a particular order to the blocks in FIGS. 2 and 3 does not necessarily imply that there is a required or preferred order for the blocks and the order and arrangement of the block may be varied. Furthermore, it may be possible for some blocks to be omitted. For example in some implementations the over coating portion 61 might not be provided.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this detailed description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class.

Although embodiments of the present invention have been described in the preceding paragraphs with reference to various examples, it should be appreciated that modifications to the examples given can be made without departing from the scope of the invention as claimed. For example the methods used to form the conductive traces 49, 53 and connections may comprise any suitable technique such as laser direct structuring molded interconnect devices (MID) technology, ink jet printing, pad printing, micro jet printing or dispensing, screen printing printable electronics (PE) manufacturing methods such as inkjet printing using conductive nano inks such as gold, copper, silver or dielectric polymers, or any other suitable method.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A portable electronic device comprising:
a covering portion comprising at least a first conductive trace and a second conductive trace, wherein the covering portion is configured to cover at least part of the portable electronic device, wherein the covering portion is configured to form part of an external housing of the portable electronic device, wherein the covering portion that forms part of the external housing is accessible to a user when using the portable electronic device, and wherein the covering portion is configured to cover, at least in part, components of the portable electronic device; and
a microphone configured to be electrically and mechanically connected to the covering portion so as to enable the covering portion to be electrically connected to a circuit board of the portable electronic device based on the at least first and second conductive traces, wherein the microphone is electrically connected to the at least first and second conductive traces of the covering portion;
wherein the covering portion and the at least first and second conductive traces are integrally formed.

2. The portable electronic device as claimed in claim 1, wherein the microphone is connected to the covering portion so that the microphone is aligned with an audio inlet on the covering portion.

3. The portable electronic device as claimed in claim 1, wherein the microphone is provided within a microphone assembly.

4. The portable electronic device as claimed claim 1, wherein the microphone is coupled to the covering portion as one of:
adhered; or
soldered.

5. The portable electronic device as claimed in claim 1, wherein the first conductive trace and the second conductive trace form at least a portion of at least one electrical connection printed on to the covering portion.

6. The portable electronic device as claimed in claim 1, wherein the covering portion is configured to house components on the circuit board.

7. The portable electronic device as claimed in claim 1, wherein the first conductive trace and the second conductive trace form at least a portion of at least one electrical connection on the covering portion which enables the microphone to be electrically connected to components on the circuit board.

8. The portable electronic device as claimed in claim 3, wherein a gap is provided between the microphone assembly and the circuit board.

9. The portable electronic device as claimed in claim 1, wherein an over coating portion is provided overlaying the microphone.

10. A method comprising:
providing a covering portion comprising at least a first conductive trace and a second conductive trace, wherein the covering portion is configured to cover at least part of a portable electronic device, wherein the covering portion is configured to form part of an external housing of the portable electronic device, wherein the covering portion that forms part of the external housing is accessible to a user when using the portable electronic device, and wherein the covering portion is configured to cover, at least in part, components of the portable electronic device; and providing a microphone configured to be electrically and mechanically connected to the covering portion so as to enable the covering portion to be electrically connected to a circuit board of the portable electronic device based on the at least first and second conductive traces, wherein the microphone is electrically connected to the at least first and second conductive traces of the covering portion, and wherein the covering portion and the at least first and second conductive traces are integrally formed.

11. The method as claimed in claim 10, wherein the microphone is connected to the covering portion so that the microphone is aligned with an audio inlet on the covering portion.

12. The method as claimed in claim 10, wherein the microphone is coupled to the covering portion with one of:
  adhering; or
  soldering.

13. The method as claimed in claim 10, wherein the first conductive trace and the second conductive trace form at least a portion of at least one electrical connection printed on to the covering portion.

14. The method as claimed in claim 10, wherein the covering portion is configured to house components on the circuit board.

15. The method as claimed in claim 10, wherein the first conductive trace and the second conductive trace form at least a portion of at least one electrical connection on the covering portion which enables a microphone assembly to be electrically connected to components on the circuit board.

16. The method as claimed in claim 10, wherein a gap is provided between the microphone and the circuit board.

17. The method as claimed in claim 10, wherein an over coating portion is provided overlaying the microphone.

18. A portable electronic device comprising:
  a covering portion comprising at least a first conductive trace and a second conductive trace, wherein the covering portion is configured to cover at least part of the portable electronic device, wherein the covering portion is configured to form part of an external housing of the portable electronic device, wherein the covering portion that forms part of the external housing is accessible to a user when using the portable electronic device, and wherein the covering portion is configured to cover, at least in part, components of the portable electronic device; and
  a sensor configured to be electrically and mechanically connected to the covering portion so as to enable the covering portion to be electrically connected to a circuit board of the portable electronic device based on the at least first and second conductive traces, wherein the sensor is electrically connected to the at least first and second conductive traces of the covering portion;
  wherein the covering portion and the at least first and second conductive traces are integrally formed.

19. The portable electronic device as claimed in claim 18, wherein the sensor comprises a microphone electrically connected to the at least first and second conductive traces of the covering portion.

* * * * *